United States Patent Office 3,667,983
Patented June 6, 1972

3,667,983
FLEXIBLE COLOUR PRINTED LAMINATE AND METHOD OF MAKING SAME

Robert H. Haggas, 9 Southway, Eldwick, and John S. Haggas, 4 Stoney Ridge, Cottingley, both of Bingley, England No Drawing. Continuation-in-part of application Ser. No. 626,937, Mar. 30, 1967. This application Dec. 4, 1969, Ser. No. 882,275
Claims priority, application Great Britain, Apr. 7, 1966, 15,551/66
Int. Cl. B44d *1/32;* B44m *1/24*
U.S. Cl. 117—15 8 Claims

ABSTRACT OF THE DISCLOSURE

A colour printing process which enables conventional lithographic and letterpress inks and techniques to be employed for printing on classes of flexible thermoplastic sheet material, to which such inks, being polymerisable, do not normally adhere readily, so as to provide a durable print. The problem of obtaining an enduring bond between such inks and base sheet, is overcome by the use of a synthetic lacquer which permeates the printwork and serves both as a bonding agent and as a protective coating. The resulting colour prints are more delicate than those produced by the silk screen process which has hitherto normally been used for such base materials.

This invention relates to colour printing on flexible plastics sheet material, and has particular reference to colour printing on thermoplastic materials such, for example as plasticised polyvinyl chloride sheet, to which conventional printing inks do not adhere durably.

This application is a continuation-in-part of our prior application Ser. No. 626,937 filed Mar. 30, 1967 now abandoned.

The object of the invention is to produce delicate colour prints upon flexible sheet plastics of this kind.

For the more delicate forms of conventional colour printing, particularly multi-colour printing, upon such materials as paper, it is preferable to employ lithographic or letterpress techniques (which terms shall be deemed to include offset lithographic and offset letterpress techniques). If silk screen printing is employed, the delicacy and fine detail of the work is apt to be lost, and other methods of applying colour such as spraying, brush-coating or dipping, cannot be used except to apply single colours.

In the established lithographic and letterpress techniques for printing on paper, it is necessary to use colouring media in the form of what are generally termed "printers inks" which are compounded especially for these processes.

It is known that synthetic lacquers can be successfully applied to the surface of plasticised thermoplastic sheets, and that such lacquers will adhere satisfactorily to the extent that they cannot readily be rubbed or wiped off, and the bond is not affected by crumpling the sheet. However, coloured synthetic lacquers can normally only be applied by silk screening, by photogravure and flexographic printing methods, or brush coating, roller coating or dipping. Thus, while lacquer of a single colour can be applied to flexible plastics sheet by brushing, spraying or dipping, and a multiplicity of different coloured lacquers can be applied by silk screening or flexographic printing, the fine quality of multi-coloured lithographic or letterpress work cannot be achieved with coloured synthetic lacquers, which are not suitable for either lithographic or letterpress printing.

Attempts to achieve more delicate results, by using conventional lithographic or letterpress inks and techniques for colour printing on plasticised thermoplastic sheet, have heretofore been found to present insuperable difficulties. If conventional lithographic and letterpress inks are used which dry by oxidative polymerization to a flexible layer it is found that the bond, if any, between the printing and the flexible plasticised thermoplastic sheet is poor and the printing can easily be wiped or rubber off in use. If such inks modified with sufficient resin or resins (usually synthetic) are used to give better adhesion, this is found still to be insufficient and, in addition, the printing tends to dry by oxidation, to a hard brittle condition which is liable to craze and crack if the sheet is folded in use.

Thus it has not hitherto been found possible to produce a satisfactory stable and durable multi-colour print on flexible plastics sheet material such as plasticised polyvinyl chloride sheet, using conventional lithographic or letterpress inks and techniques. In the case of highly plasticised sheets, it is very easy to rub or wipe off the colour, because even though at first sight a bond appears to have been achieved, after a time the printwork appears to lose any tendency which it had to adhere firmly to the surface of the sheet. These difficulties are largely attributed to the phenomenon known as "migration" of the plasticiser, which appears to inhibit any form of chemical or physical bond between the printing ink and the plasticised sheet to which it is applied.

It is a principal object of the present invention to provide an improved colour printing process, especially a multi-colour process, upon thermoplastic sheet material selected from the group consisting of plasticised polyvinyl chloride and plasticised vinyl chloride co-polymers; polyolefins; polyurethanes; polycarbonate; polyacetals and acetal co-polymers (hereinafter collectively called "unreceptive thermoplastic sheet material"), using conventional lithographic or letterpress inks and techniques.

A further object is to provide an improved product in the form of a laminate comprising unreceptive thermoplastic sheet material delicately colour printed on at least one face, and having an improved quality and durability.

The invention is based on the appreciation that it is possible successfully to apply conventional polymerisable lithographic or letterpress printing inks and synthetic lacquers in sequence upon flexible unreceptive thermoplastic sheet material, so as to achieve a high quality and stable colour print which has hitherto not been possible.

In our invention we apply the printing ink directly on to the thermoplastic sheet, and we then cover the polymerised printwork with a coating layer of synthetic lacquer, in which case the lacquer not only permeates the printwork bond itself, together with the interposed layer of ink, firmly to the base sheet, but also acts as a protective surface coating so that neither the printwork nor the surface coating of synthetic lacquer can readily be detached from the sheet.

It will thus be seen that this invention enables, for the first time, conventional lithographic or letterpress inks and techniques to be employed to colour print on unreceptive thermoplastic sheet material.

The term "sheet" is used herein to denote a flexible thin material which is either in short lengths or continuous lengths. Thus, while the present invention is particularly applicable to flexible plasticised thermoplastic calendered sheet it may also be applied to flexible thermoplastic sheet produced by casting or extrusion.

It will be appreciated that according to the intended nature and effect of the printwork, the sheet may be transparent or opaque and the colour may be applied in single colour and/or in multi-colour. The invention includes applying and fixing the colour work to one or both sides of the sheet.

Where reference is made in this specification to a "layer" of colour, it should be understood that such layer may be applied over the whole of the sheet or only to selected parts thereof. The expression "colour" is intended to include black, and white when applied as an opaque layer on transparent or opaque material.

The polymerisable lithographic or letterpress printing ink may contain inorganic or organic colouring pigments and a resin carried by an oxidation-drying vehicle, for example a phenolic resin in tung oil, together with a solvent.

In carrying the present invention effect therefore a polymerisable printing ink is employed of the type known to those skilled in the art to be suitable for application to a variety of paper surfaces by the lithographic or letterpress techniques.

One of the advantages of the present improved method of colour printing is that it can be used to produce a laminate which is exceedingly supple and which can be subjected to severe crumpling and creasing without damaging the colour printing and without losing its ability to recover substantially all of its original smoothness.

According to the final effect which is desired, the final overcoating of synthetic lacquer may be applied by spraying, silk screening, brushing, roller coating or dipping, or other conventional methods.

The basic material of the synthetic lacquer must evidently be selected to match the particular sheet material which is to be colour printed. We have found that, for the types of sheet materials listed above, the basic material of the lacquer should be selected from the group consisting of:

(a) Two-part polyurethane, made from a polyol and a polyisocyanate and mixed immediately before use.
(b) Butyl methacrylate/methyl methacrylate co-polymer.
(c) Polyamides made from dimerized vegetable acids and diamines.

The make up of lacquers from the above-listed materials will be carried out in manner known to those skilled in the art using solvents and/or additives where necessary, according to the nature of the basic material from which the lacquer is made.

The function of the lacquer is to permeate the printwork and bond itself and the printwork firmly to the sheet material, and also to provide a continuous overcoating film to contain and protect the printwork. The lacquer film, when dried must be non-blocking.

The required combinations of sheet material and basic material for the lacquer are shown in the following tables.

TABLE 1

| Sheet material | Basic material of lacquer |
|---|---|
| (i) Plasticised polyvinyl chloride. | Butyl methacrylate/methyl methacrylate co-polymer. |
| (ii) Plasticised vinyl chloride/vinyl acetate co-polymer. | |
| (iii) Plasticised vinyl chloride/vinylidine chloride co-polymer. | |
| (iv) Unplasticised vinyl chloride/vinylidine chloride co-polymer. | |
| (v) Acetal co-polymer. | |

TABLE 2

| Sheet material, polyolefins viz— | Basic material of lacquer |
|---|---|
| (i) Polyethylene (low, medium and high density). | Polyamides made from dimerized vegetable acids and diamines. |
| (ii) Polypropylene. | |
| (iii) Ethylene/propylene copolymer. | |
| (iv) Ethylene/vinyl acetate co-polymer. | |
| (v) Polymethyl pentene. | |

TABLE 3

| Sheet material | Basic material of lacquer |
|---|---|
| (i) Polyurethane (linear diol, linear diisocyanate). | Two-part polyurethane, made from a polyol and a polyisocyanate and mixed immediately before use. |
| (ii) Polycarbonate. | |
| (iii) Polyacetal. | |

In one example an opaque base layer may have a layer of coloured printwork thereon, protected and bonded by transparent lacquer, through which the image shows. In another example, a transparent layer may have a reverse image layer of coloured printwork thereon protected and bonded by opaque lacquer, e.g. white, the image showing through the base sheet. In yet another example, both the base layer and the lacquer may be transparent, the result being a coloured transparency. With multi-colour printing the colour application can be in a desired conventional or other order and the following four colours may be in the order of black, blue, red and yellow. After the printing process the laminate is dried at room or an elevated temperature. When the protective coating is pigmented, the pigmentation may be selected to combine effectively with the colourwork on the sheet, so as to enhance the general effect. The printed sheet can be used in its flat form for backings or coverings, for show cards or other media, or the printed sheet could be formed into shapes by cutting or moulding.

The present method of print on plastic sheet produces a flexible and abrasion resistant colour print. Thus the process may be used to provide a school-book or diary or a paperback novel with a tear-proof colour cover which is soft and glossy but washable and strong.

It will be apparent that provided that at least one of the outer films is transparent (for example the basic plastic polyvinyl chloride sheet material or the lacquer) the mode of application of the present application can be varied.

Following is a description of methods of carrying the invention into effect wherein Examples A1, A2, B and C relate to a 3-step process for obtaining plastic sheet material colour printed on one side while Example D relates to plastic sheet material colour printed on both sides.

EXAMPLE A1

Plastic (transparent) plasticised polyvinyl chloride calendered sheet.
Coloured inks: Yellow E63863, Red B35408, Blue C46005 and Black A22301 manufactured by Johnstone & Cumbers Ltd. of London, applied by lithographic technique.
Lacquer (opaque) "Matt-Vinyl White" (manufactured by Screen Process Supplies of London, England).
Result: Positive.
Picture shows through plastic.

EXAMPLE A2

Plastic (transparent) plasticised polyvinyl chloride calendered sheet.
Coloured inks: Process Yellow Offset Litho for P.V.C. LX 90374. Process Magenta Offset Litho for P.V.C. LX 90375. Process Cyan Offset Litho for P.V.C. LX 90376. Process Black Offset Litho for P.V.C. LX 90377 manufactured by Mander-Kidd of Wolverhampton, England.
Lacquer (opaque) White Silk Screen Ink for P.V.C. ZM 4512 manufactured by Mander-Kidd of Wolverhampton, England.

The above "offset litho" inks are applied by lithographic or letter press printing and the lacquer by silk screening.

EXAMPLE B

Plastic (opaque)
Coloured Ink
Lacquer (transparent)
Result: Positive
Picture shows through lacquer

EXAMPLE C

Plastic (transparent)
Coloured Ink
Lacquer (transparent)
Result: Transparency

In the above examples the coloured ink is applied by letterpress or lithographic printing and the lacquer by silk screening.

EXAMPLE D

Lacquer (transparent)
Ink
Plastic ((a) transparent or (b) opaque)
Ink
Lacquer (transparent)
Result: (a) Transparency; (b) Two pictures on opposite faces.

It should be understood that Examples A1 and A2 above have been described in relation to one only of the several types of sheet material comprised within the invention viz: plasticised polyvinyl chloride.

The selection of appropriate printing inks for the other listed materials will depend upon the surface finish of the sheet material and the nature of the colour print and will be obvious to a skilled printer, since the invention does not involve the use of a special ink which (of itself) will bond to (as distinct from drying on) the thermoplastic sheet material.

Such special inks or coating compositions are known for the flexographic printing of thermoplastic sheet materials. They are discussed, for example, in Canadian Pat. 661,486 (Adams); U.S. Pat. 3,091,545 (Adams) and U.S. Pat. 3,224,894 (Palmer), and are analogous to the lacquer used by the applicants in this present invention, because, unlike the lithographic and letterpress inks which applicants use, these special inks do have the ability to form a durable bond to the sheet material, but they tend (as Adams points out) to result in offsetting and blocking.

We claim:

1. A laminate comprising a flexible base layer of thermoplastic sheet material selected from the group consisting of plasticised polyvinyl chloride and plasticised vinyl chloride co-polymers, polyolefins, polyurethane, polycarbonate, polyacetal and acetals co-polymers; to which is applied by conventional lithographic or letterpress techniques, a layer of printwork in conventional oxidation polymerisable lithographic or letterpress ink in at least one colour, said ink being that normally used for printing on paper and therefore not naturally adherent durably to said sheet material and an overcoating of flexible synthetic lacquer that has permeated said printwork and has durably bonded said printwork to said base layer and has also provided a continuous durably adherent external protective coating over said printwork.

2. An improved colour print comprising a laminate according to claim 1, and in which said printwork is a coloured printed photographic image.

3. A colour print according to claim 2, wherein said thermoplastic sheet material is transparent and said printed image is printed on one side of said sheet and said coating is opaque, said image being displaced through said sheet against a background formed by said opaque coating.

4. A colour print according to claim 2, wherein said thermoplastic sheet material is opaque and wherein said printed image is printed on one side of said sheet and said coating is transparent, said image being displayed through said coating against a background formed by said opaque sheet material.

5. A colour print according to claim 2, wherein said thermoplastic sheet material is opaque, said printed image appears on both sides of said sheet and is displayed through said coating which is transparent.

6. A color transparency comprising the laminate according to claim 2, wherein said thermoplastic sheet material and said coating are transparent and wherein said printed image is printed on at least one side of said sheet, said image being displayed through both said sheet and said coating.

7. An improved process for the production of colour prints on a base layer of thermoplastics sheet material selected from the group consisting of plasticised polyvinyl chloride and plasticised vinyl chloride co-polymers, polyolefins, polyurethane, polycarbonate, polyacetal and acetal co-polymers; the improvement comprising the application to said base layer by conventional lithographic or letterpress techniques of a printed image on at least one surface of said base layer said printed image being formed by conventional oxidation polymerisable lithographic or letterpress inks normally used for printing on paper and therefore not naturally adherent durably to the material of said base layer, and the fixing of said printed image to said base layer by superimposing a layer of flexible synthetic lacquer that permeates said printed image and durably bonds it to said base layer and provides a durably adherent external protective flexible coating for said printed image.

8. A process according to claim 7, wherein the basic film forming material of said synthetic lacquer is selected from the group consisting of (a) butyl methacrylate/methyl methacrylate copolymer (b) polyamides made from dimerized vegetable acids and diamines (c) two part polyurethane made from a polyol and a polyisocyanate and mixed immediately before use.

References Cited

UNITED STATES PATENTS

| | | | |
|---|---|---|---|
| 3,224,894 | 12/1965 | Palmer | 117—45 |
| 3,091,545 | 5/1963 | Adams | 117—38 |

FOREIGN PATENTS

| | | | |
|---|---|---|---|
| 661,486 | 4/1963 | Canada | 117—45 |

ALFRED L. LEAVITT, Primary Examiner

M. F. ESPOSITO, Assistant Examiner

U.S. Cl. X.R.

117—12, 14, 45, 68, 138.8 D, 138.8 E, 138.8 F